F. N. Corbin.
Whiffle-Tree Evener.
Nº 78064 Patented May 19, 1868.
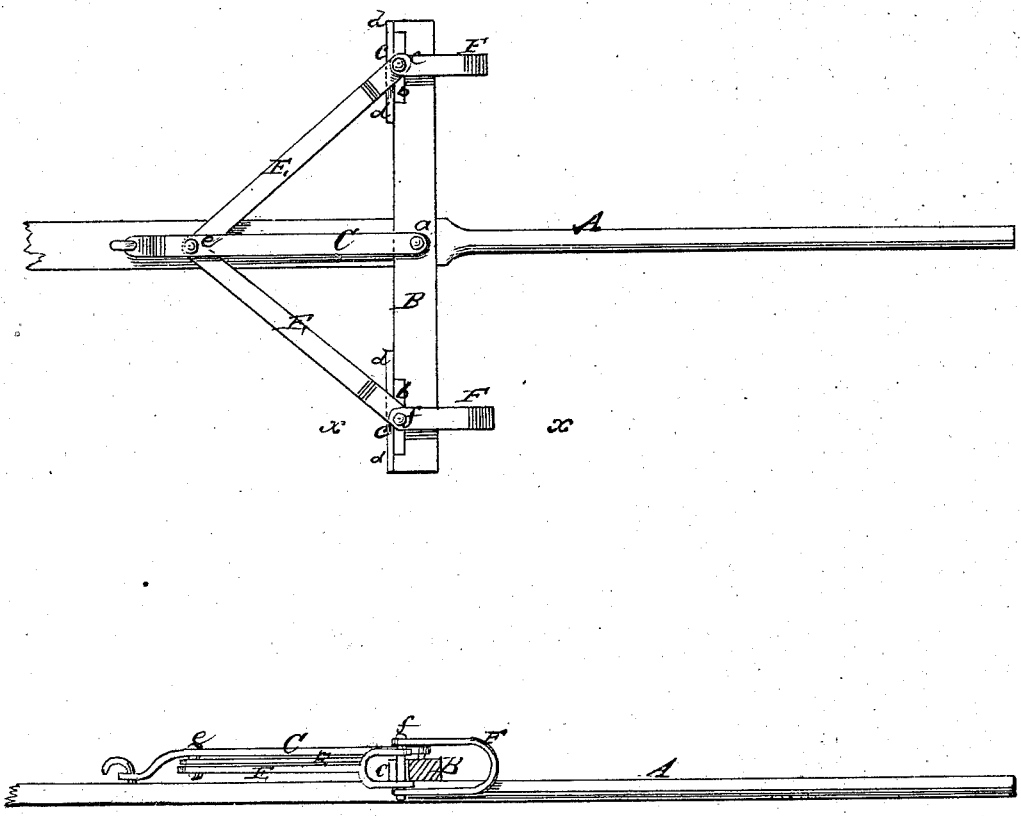
Witnesses.
W. C. Astketto
Wm A Morgan
Inventor.
F. N. Corbin
per
Nmmy &
Attorneys

United States Patent Office.

FREMAN N. CORBIN, OF CHAMPLAIN, NEW YORK.

Letters Patent No. 78,064, dated May 19, 1868.

IMPROVEMENT IN WHIFFLE-TREE EVENER.

*The Schedule referred to in these Letters Patent and making part of the same.*

TO ALL WHOM IT MAY CONCERN:

Be it known that I, FREMAN N. CORBIN, of Champlain, in the county of Clinton, and State of New York, have invented a new and improved Evener; and I do hereby declare that the following is a full, clear, and exact description thereof, which will enable those skilled in the art to make and use the same, reference being had to the accompanying drawings, forming part of this specification.

This invention relates to a new and improved application of a double-tree to the draught-pole of a wheel-vehicle, as hereinafter fully shown and described, whereby the clevises to which the whiffle-trees are attached will be shifted laterally, one being brought nearer to the draught-pole as the other is moved outward from it, so that the most ambitious or the strongest-pulling horse, whenever he exerts himself more than the other, will have his leverage power on the double-tree decreased, while at the same time the leverage power of the other horse will be proportionably increased.

By this arrangement a team will soon be made to pull evenly without any special care or attention on the part of the driver. In the accompanying sheet of drawings—

Figure 1 is a plan or top view of my invention.

Figure 2 a side sectional view of the same, taken in the line $x\ x$, fig. 1.

Similar letters of reference indicate corresponding parts.

A represents a draught-pole, and B a double-tree, attached thereto by a bolt, $a$, which bolt passes through the front end of a metal plate, C, the rear end of the latter being fitted on a hook, D, at the rear part of the draught-pole, the plate C serving as a stay to bolt $a$.

The double-tree B has two oblong notches, $b\ b$, made in its rear side, one near each end, and these notches are covered by metal plates $c\ c$, which are bolted to the rear side of the whiffle-tree, as shown at $d$, fig. 1.

E E represent two bars, the rear ends of which are attached by a pivot-bolt, $e$, to the under side of the rear part of the plate C.

The front ends of the bars E are made in the form of forks, and to their forked ends clevises F F are attached, by bolts $f$, and these bolts pass through the oblong notches $b\ b$, and are allowed to slide freely therein.

The whiffle-trees are attached to the clevises F F.

By this arrangement it will be seen that when one horse pulls more than the other, the end of the double-tree to which the strongest-pulling horse is attached will be drawn forward, and the clevis at the forward end of the double-tree moved towards the draught-pole, while the other clevis will be moved outward therefrom, giving the weaker horse the greatest leverage power, and causing him to move forward in line with the stronger one.

This automatic arrangement will soon cause a team to pull evenly, however irregular they may be in their draught-action when first attached to the vehicle.

I claim as new, and desire to secure by Letters Patent—

The combination of the double-tree B, clevises F F, bars E E, all arranged and applied to the draught-pole A, to operate in the manner substantially as and for the purpose set forth.

The above specification of my invention signed by me, this 19th day of February, 1868.

FREMAN N. CORBIN.

Witnesses:
B. M. BECKWITH,
B. D. CLAPP.